United States Patent [19]

Denissen et al.

[11] Patent Number: 5,659,556

[45] Date of Patent: Aug. 19, 1997

[54] DEVICE FOR PROCESSING DIGITAL DATA AND DIGITAL VIDEO SYSTEM COMPRESSING THE DEVICE

[75] Inventors: Adrianus J. M. Denissen; Bernardus A. M. Zwaans, both of Eindhoven, Netherlands

[73] Assignee: U.S. Philips Corporation, New York, N.Y.

[21] Appl. No.: 445,256

[22] Filed: May 19, 1995

Related U.S. Application Data

[63] Continuation of Ser. No. 380,927, Jan. 31, 1995, abandoned, which is a continuation of Ser. No. 6,097, Jan. 4, 1993, abandoned.

[30] Foreign Application Priority Data

Jan. 7, 1992 [EP] European Pat. Off. .............. 92200026

[51] Int. Cl.$^6$ ................................................. H03M 13/00
[52] U.S. Cl. ................................................ 371/40.1
[58] Field of Search ................................ 371/40.1–40.4, 371/21.1–21.6

[56] References Cited

U.S. PATENT DOCUMENTS

| | | | |
|---|---|---|---|
| 4,577,319 | 3/1986 | Takeuchi et al. | 371/40.3 |
| 4,604,750 | 8/1986 | Manton et al. | 371/40.2 |
| 4,641,310 | 2/1987 | Martens et al. | 371/40.3 |
| 4,799,113 | 1/1989 | Murakami | 371/40.2 |
| 4,802,173 | 1/1989 | Baggen . | |
| 4,916,541 | 4/1990 | Hashimoto et al. | 358/160 |
| 5,003,541 | 3/1991 | Mester | 371/40.1 |
| 5,202,890 | 4/1993 | Iketani et al. | 371/40.3 |
| 5,222,069 | 6/1993 | Chevallay | 371/40.3 |

FOREIGN PATENT DOCUMENTS

| | | | |
|---|---|---|---|
| 0401855 | 12/1990 | European Pat. Off. | H03M 13/00 |
| 0414222 | 2/1991 | European Pat. Off. | H04N 7/137 |

*Primary Examiner*—James P. Trammell
*Attorney, Agent, or Firm*—Michael E. Marion

[57] ABSTRACT

A device for processing digital data comprises a memory, error detection means and control means which selects addresses for the writing of the data in the memory on the basis of errors detected in the data, and which selects further addresses for the reading of data from the memory. Thus, only reliable data is read so that a high picture quality is achieved in a digital video system, despite the presence of errors in the data.

7 Claims, 2 Drawing Sheets

DEVICE FOR PROCESSING DIGITAL DATA AND DIGITAL VIDEO SYSTEM COMPRESSING THE DEVICE

This is a continuation of application Ser. No. 08/380,927, filed Jan. 31, 1995, now abandoned, which is a continuation of application Ser. No. 08/006,097, filed Jan. 4, 1993, now abandoned.

BACKGROUND OF THE INVENTION

The invention relates to a device for processing digital data, comprising a memory and detection means for detecting errors in the digital data, and also relates to a digital video system comprising a video input, a video output, a video processor, a DCT circuit, a variable-length encoder-decoder circuit, a modulator-demodulator circuit, at least one read/write head, and also comprising a device.

A device and a digital video system of the kind set forth are known from European Patent Application 0 398 651 A2, which describes a device in which digital data is written into a memory, after which an error correction and detection circuit corrects errors, if possible, and supplies a detection signal on the basis of which the data stored in the memory is read, or not, for supply to a frame memory. The write operation in the frame memory is interrupted when the number of errors detected per frame exceeds a given threshold value. The same data is then read again from the frame memory. Drawbacks of such a device reside in the fact that the data is to be transferred from one memory to the other memory, requiring numerous addressing operations, and that the memories comprise a multitude of connection pins which impedes integration of the device on an IC. In another embodiment of the device described in said Application, the data is applied to the frame memory via a series-parallel converter, the write operation in the frame memory again being interrupted when an excessive number of errors has been detected. The circuit used therein is very complex.

SUMMARY OF THE INVENTION

It is inter alia an object of the invention to provide a device for the processing of digital data which does not have the above drawbacks and which has a more compact construction. To achieve this, a device in accordance with the invention is characterized in that the device also comprises control means for writing, in dependence on errors detected by the detection means, incoming digital data at selected addresses in the memory and for reading out reliable digital data from the memory at further selected addresses. A single memory thus suffices. The device delivers only data deemed to be reliable by the detection means (for example, data containing a number of errors below a given threshold value or data corrected by means of an error correction code).

An embodiment of the device in accordance with the invention is characterized in that the control means writes the incoming data at those addresses of the memory where the last reliable data read is not stored. As a result, the memory will contain an adequate amount of reliable data at any instant.

A further embodiment of the device in accordance with the invention is characterized in that the digital data contains a video signal with an error-correction code, the memory comprising a first and a second sub-memory, each of which is suitable to store an amount of data equal to one frame of the video signal, the control means distributing the incoming data line-wise per frame among the sub-memories by writing the data at those addresses at which the data representing the last frame read is not stored. Thus, the memory will always store a frame of lines consisting of reliable data. It is to be noted that the selection of the addresses in the two sub-memories, of course, can also be performed on the basis of several lines simultaneously.

A further embodiment of the device in accordance with the invention is characterized in that the control means extracts the outgoing data line-wise per frame from one of the sub-memories by reading the data at those addresses at which the last reliable data written is stored. The device thus supplies frames of the video signal which are composed of lines containing reliable data. A suitable picture quality is thus ensured, even when the incoming video signal contains errors.

BRIEF DESCRIPTION OF THE DRAWINGS

A further embodiment of the device in accordance with the invention is characterized in that the memory comprises two parallel-connected standard 1-Mbit SRAMs. This is a simple and inexpensive implementation.

DETAILED DESCRIPTION OF THE PREFERRED EMBODIMENTS OF THE INVENTION

Figure 1:
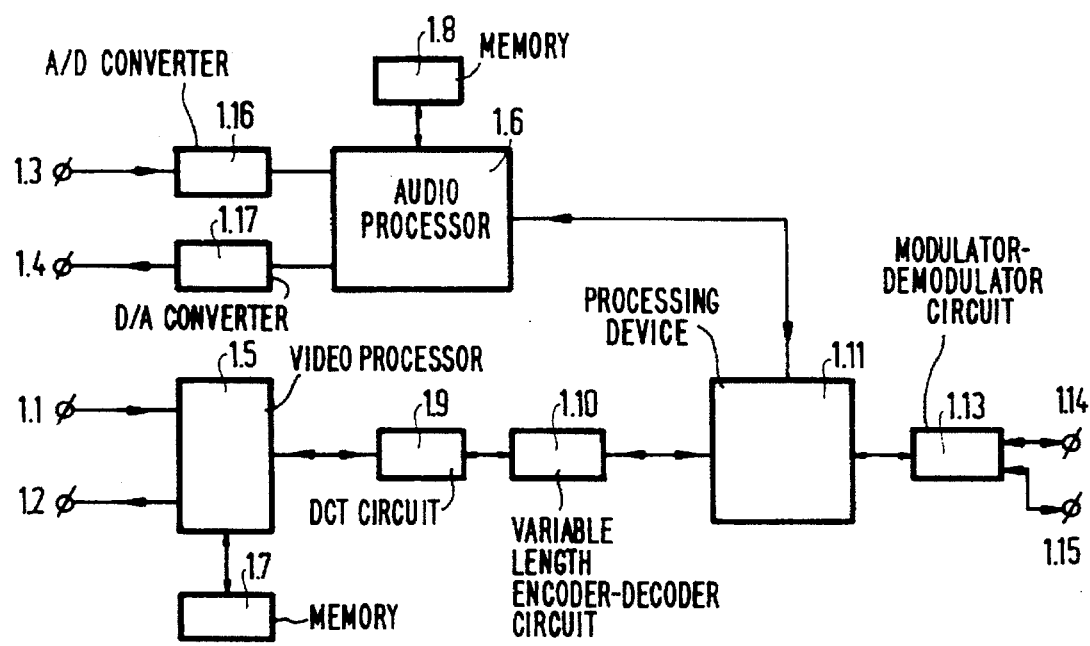
FIG. 1 shows a digital video system in accordance with the invention.

FIG. 1 shows a digital video system which is suitable for use of a device in accordance with the invention. A system of this kind comprises a video input 1.1 for the supply of digital video data to a video processor 1.5 in the recording mode. The video data may originate, for example from a digital picture pick-up unit such as a CCD camera generating 25 pictures (50 fields) per second, each containing approximately 420,000 pixels. In the video processor 1.5 each rime two fields presented are combined so as to form one frame which is stored in a memory 1.7, for example a 5-Mbit DRAM. The video data per pixel contains 8 bits of luminance information (thus suitable to represent 256 grey values) and chrominance information in a coarser raster, for example one chrominance value for each block of 2×2 pixels, determined by 2 8-bit values. In the video processor 1.5 there are also formed blocks of 8×8 bytes (1 byte=8 bits), so-called DCT blocks, which are to be distinguished as luminance DCT blocks and chrominance DCT blocks. Four luminance DCT blocks (each associated with 8×8 pixels) and their two associated chrominance DCT blocks together form a so-called DCT unit. Each rime five DCT units, determined by shuffle in the video processor 1.5, form a so-called segment. The shuffle has an averaging effect, which is advantageous for the data reduction to be subsequently performed. Each DCT block is transformed in a known Discrete Cosine Transformation (and inverse DCT) circuit 1.9. Subsequently, per segment (i.e. per 30 DCT blocks) data reduction is performed in a known variable-length encoder-decoder circuit 1.10. Therein, for example the 30*64*8=15,360 bits of each segment are reduced to 3072 bits, using known techniques such as quantization and variable-length encoding. Quantization can be performed, if desired in parallel in various ways, each rime the most suitable way being chosen.

Such a system may also comprise an audio input 1.3 for the supply of digital audio data to an audio processor 1.6 in the recording mode. The audio data may originate, for example from one or more microphones which supply the audio processor 1.6 with digital data via an analog-to-digital converter 1.16, which audio processor is connected to a memory 1.8, for example a 256-Kbit SRAM. Generally speaking, the audio data is far less numerous than the video data, so that data reduction is not required for the audio data.

Figure 2:
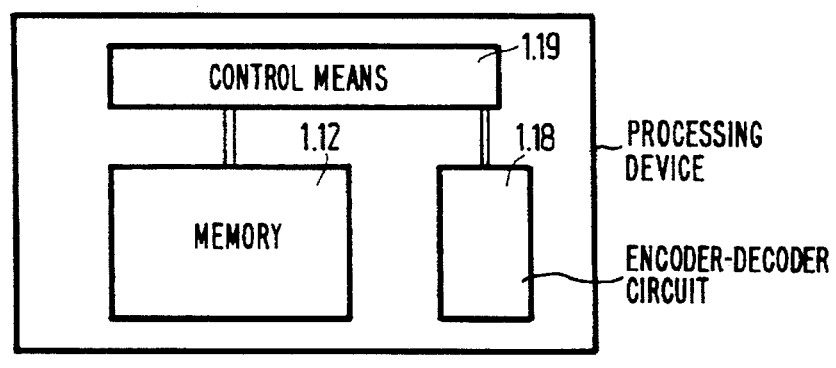
FIG. 2 shows a device in accordance with the invention.

The audio data of the processor 1.6 (in which blocks are also formed) and the reduced video data of the circuit 1.10 is applied to a processing device 1.11 (see FIG. 2) which comprises a memory 1.12, an error-correction encoder-decoder circuit 1.18 (referred to hereinafter as erco circuit for the sake of brevity), and control means 1.19. In the recording mode, the data is provided with a known error-correction code, for example a Reed-Solomon product code, in the erco circuit 1.18. Such a code is described in U.S. Pat. No. 4,802,173. In the stream of digital data data words are formed, each data word being encoded in conformity with the error-correction code so as to be stored as cede words on a storage medium (in the recording mode). Should the code words, after acquisition from the storage medium (in the reproduction mode) no longer fully correspond to the original code words due to disturbances or damage of any kind, the error-correction code enables error correction during decoding. A number of bytes (or other data symbols) to be protected by the error-correction code is arranged in a rectangular array, after which so-called parity symbols are assigned to each horizontal row and each vertical column (i.e. to each horizontal and each vertical data word) in conformity with the rules of the relevant code. The data words with added parity symbols are referred to as code words. The parity symbols represent redundant information and enable correction of errors in the array of bytes which occur during transport of the data or due to damaging of the storage medium. The generation and operation of these codes is described, for example in Richard E. Blahut: "Theory and practice of error control codes", 1983, Addison-Wesley Publ. Comp. Inc., and also in N. Glover & T. Dudley: "Practical error correction design for engineers", 1982, Data Systems Technology Corp., Broom field Colorado.

The number of luminance DCT blocks per frame amounts to 720/8*576/8=6480. There are 3240 chrominance DCT blocks per frame. Thus, there are 1620 DCT units or 324 segments per frame. For a field frequency of 50 Hz, a frame is subdivided into 12 so-called tracks (in the case of a frequency of 60 Hz, a frame is subdivided into 10 tracks). In addition to the data symbols and the parity symbols, such a track also contains inter alia identification and synchronization information. The data symbols and the parity symbols of a track will be referred to hereinafter as an RS video block. Thus, per RS video block there are 27 segments. Each segment of 3072 bits (=384 bytes) in an RS video block constitutes 3 lines of 128 bytes, including 1 byte of auxiliary data AUX per line, for example data concerning the elapsed rime or the frame number. An RS video block thus comprises 81 lines of 128 bytes which form 81 horizontal and 128 vertical data words. For each RS block, in the erco circuit 1.18 the parity symbols associated with the constituent data symbols are determined according to a Reed-Solomon product code so as to be added. For example, first an outer code can be applied to the vertical data words and subsequently an inner code can be applied to the horizontal data words. The standard notation for such a Reed-Solomon code is RS(k+p,k,p+1), k being the number of data symbols of the code to be protected and p being the number of parity symbols. For the outer code use can be made of: RS (88,81,8) code over GF(256), derived from the primitive polynomial $x^8+x^4+x^3+x^2+1$. For the inner code use can be made of: RS(136,128,9) code over GF(256), derived from the primitive polynomial $x^8+x^4+x^3+x^2+1$. For the encoding in the recording mode and the decoding in the reproduction mode it is necessary to store the digital data temporarily in a memory 1.12. This is realised as follows. The variable-length encoder-decoder circuit 1.10 applies non-encoded video data to the circuit 1.11 in which it is row-wise written into the memory 1.12 under the control of the control means 1.19. The address at which the data is written is dependent on the locations where the last reliable frame has been stored, as will be described hereinafter. Per RS video block there are 81 rows and 128 columns of bytes, forming 81 horizontal data words of 128 bytes and 128 vertical data words of 81 bytes. The erco circuit 1.18 provides the vertical data words with the associated parity symbols of the outer code which are also written into the memory. Subsequently, the horizontal data words of the memory 1.12 are provided with parity symbols in conformity with the inner code. The previously determined vertical parity symbols of the outer code then also form horizontal data words. In alternation with the processing of the video data, the audio data is also processed (for example, in a multiplexed fashion), which audio data can be encoded, for example exclusively in conformity with the inner code. The data thus encoded in the recording mode (the code words) is applied to a known modulator-demodulator circuit 1.13 which modulates the data for supply to two read/write heads 1.14 and 1.15 whereby the data can be recorded on a storage medium, for example a magnetic tape.

For the reconstruction of the video and audio signals, the two read/write heads 1.14 and 1.15 read the code words stored on the storage medium and apply these code words to the modulator/demodulator circuit 1.13, after which the demodulated data is corrected in the circuit 1.11 by the erco circuit 1.18, if possible, by means of the parity symbols added on the basis of the Reed-Solomon product code. First the inner code (applied to the horizontal video and audio code words) is then decoded, after which the corrected data is separated into audio data, to be applied to the audio processor 1.6, and video data which is subsequently decoded in conformity with the outer code, after which it is applied to the variable-length encoder-decoder circuit 1.10. Via a digital-to-analog converter 1.17, the audio processor 1.6 applies the audio data to an audio output 1.4. The variable-length encoder-decoder circuit 1.10 decodes the variable-length code and supplements the amount of data thus obtained to 15,360 bits per segment. This data is then applied to the DCT circuit 1.9 in which the inverse Discrete Cosine Transformation takes place. The data thus produced is applied to the video processor 1.5 which renders the data suitable for and applies it to the video output 1.2.

Figure 3A:
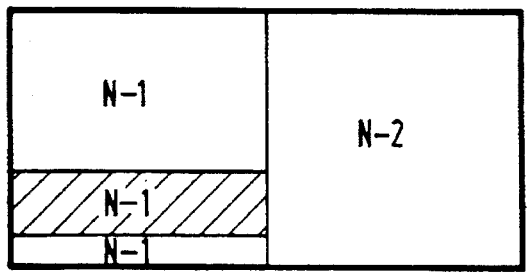
FIGS. 3A–3C illustrate the operation of the device in accordance with the invention.
Figure 3A:
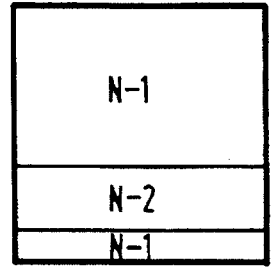
Figure 3B:
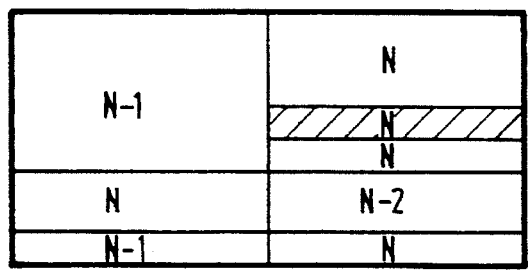
Figure 3B:
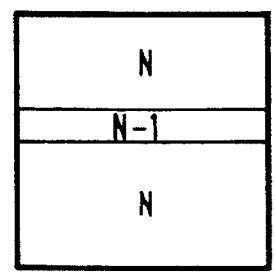
Figure 3C:
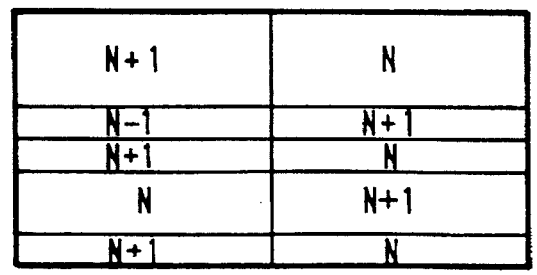
Figure 3C:
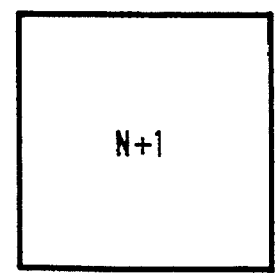

When the number of errors detected in the data exceeds the number that can be corrected by the error correction code in the reproduction mode, concealment is performed as follows. For a given amount of data (for example, per frame, or per track, or per segment, or per line), the erco circuit 1.18 detects whether this data is reliable or not. The part of the data which is not reliable is replaced by previous, reliable data. To this end, use is advantageously made of a 2-Mbit memory formed by, for example two standard 1-Mbit SRAMs connected in parallel and having the same address control. By writing incoming digital data in the memory at addresses selected in dependence on the errors detected by the erco circuit 1.18 and by reading outgoing digital data from further selected addresses of the memory, the control means 1.19 ensures that the data which has been applied to the variable-length encoder/decoder circuit 1.10 as the last frame deemed to be reliable are saved in the memory until more recent data has been stored which has also been deemed to be reliable by the erco circuit 1.18, and that only reliable data is despatched. This is illustrated in FIG. 3. The memory 1.12 comprises two sections, each of which is operative to store an amount of data equal to one frame of the video signal. A control bit C (per segment or per line, depending on the data unit on the basis of which concealment takes place), memorizes how the data representing the last reliable frame is distributed between the two halves of the memory 1.12. In the recording mode, one of the two sub-memories suffices for the temporary storage of the video data. In that case the control bit C can be dispensed with. In the reproduction mode, an entire frame having a rank number N-1 is written into the left-hand half of the memory if the previous frame (i.e. the frame having the rank number N-2) did not contain an excessive number of errors, was deemed to be reliable by the erco circuit 1.18, and is suitable for supply as an output frame to the variable-length encoder-decoder circuit 1.10 (referred to hereinafter as VLCD for the sake of brevity), see FIG. 3A. Prior to the writing of the frame N-1, the control bit C had the value 1 throughout. For the sake of simplicity, concealment on a line basis will be assumed hereinafter, even though other data units can be realised equally well. The frame N-1, for example contains a major burst error which cannot be corrected by the erco circuit 1.18, but which can be detected thereby. The control bit C is then inverted to the value 0 for all lines which are reliable. The unreliable lines, containing the burst, keep the control bit C having the value 1. On the basis of the control bit C, the control means 1.19 then reads the following data from the memory for supply to the VLCD: for the control bit having the value 0, it reads the lines from the left-hand memory section, and for the control bit having the value 1 it reads the lines from the right-hand section of the memory. Actually, the damaged part of the data of the frame N-1 is replaced by the previous, reliable, corresponding data of the frame N-2. A subsequent frame N (see FIG. 3B) is then written, under the control of the control means 1.19 at the locations in the memory 1.12 which store the data not applied to the VLCD as the previous output frame, so in the case of the control bit having the value 0 the lines from the right-hand memory section are concerned, and for the control bit having the value 1 the lines from the left-hand memory section are concerned. Subsequently, the erco circuit 1.18 again detects whether the frame N contains non-correctable errors. All control bits C are inverted again, except for the control bits associated with the lines found to be unreliable. The control means 1.19 again reads the data indicated by the control bits for supply to the VLCD: for the control bit 0, the lines from the left-hand half are concerned and for the control bit 1 the lines from the right-hand are concerned. FIG. 3C shows a next step of this process: the frame N+1 does not contain non-correctable errors and is written in the memory at the addresses determined by the control means as shown.

The control means thus selects suitable addresses for the writing of the incoming digital data on the basis of non-correctable errors (in the preceding frame) detected by the erco circuit. The control means also selects further suitable addresses for reading out the outgoing digital data, again on the basis of non-correctable errors (in the current frame) detected by the erco circuit. Data originating from a storage medium is first processed by the horizontal error decoder (the inner code). In an internal RAM, it is memorized for each line whether the line has been corrected. In dependence on the relevant control bits C, the data is stored in the memory 1.12. Per RS video block, the data is subsequently processed by the vertical error decoder (the outer code), a vertical code word being read out under the control of the control means and in dependence on the relevant control bits. Subsequently, the erco circuit 1.18 can decide whether or not the data of the RS video block is reliable. The following cases can be distinguished in this respect. The data may have been completely corrected, after which all associated control bits are inverted. If the outer decoder did not succeed in correcting the data, it may be because there were too many erasures, after which the control bit of the lines which have been corrected by the horizontal decoder is inverted (as indicated in the internal RAM). It may also be that the ensure correction reveals that too many miscorrections have been made by the inner decoder, which miscorrections can be detected but not corrected by the vertical decoder, after which the relevant control bits remain the same for the entire RS video block (concealment of the entire RS video block).

The invention also offer advantages for the so-called trick modes (slow motion, picture search and the like). In the slow motion mode, the data of an RS video block arrives from the storage medium in bursts. For example, when the slow motion has a deceleration factor 3, the data enters in 3 bursts, so that an entire frame is assembled only after three normal frame periods. During these three frame periods, reliable data of the preceding frame is continuously applied to the VLCD. When substantially a completely new frame has been assembled in the memory (evidently, again at the locations where no reliable data of the previous frame is present), the control bits C are adapted again as described above. This is not a very time-consuming process, because the decoding by the erco circuit 1.18 can be performed per RS video block. Subsequently, the data deemed reliable by the erco circuit and indicated as such in the memory by the control bits C is read during the next three frame periods and applied to the VLCD. A high-quality slow motion is thus obtained. During picture search, a fixed value may be assigned to the control bits C, because outer correction is then impossible (no complete RS video blocks arrive).

We claim:

1. A device for processing digital data items comprising:
   a) receiving means for receiving consecutive groups of related items having corresponding data parts representing time-relations of the data,
   b) memory means for storing two groups of received items at respective addresses,
   c) error detecting means connected to the receiving means and for detecting errors in said received items, said error detecting means having means for identifying high error items whose errors exceed a given threshold and low error items whose errors are below the given threshold,
   d) read control means connected to the error detecting means for reading the memory and for outputting a set of related stored items from said memory means, said read control means being operative in response to the identification of the most recently stored low error items to include in the set said low error items, said read control means being operative in response to the identification of the most recently stored high error items to include in the set corresponding parts of a previously stored data group identified as low error items,
   e) write control means connected to the error detecting means for receiving the groups of related items and writing them into the memory means in such manner that:

(i) first, low error items in a received group replace previously stored high error items, (ii) next, the remaining items in the received group replace corresponding parts in a stored group.

2. The device of claim 1 wherein the groups of related items of digital data each represent a video signal frame and wherein the memory means comprises first and second memory sections, each of which is suitable for storing an amount of data equal to one frame of the video signal.

3. The device of claim 1, wherein the read control means is operative to read low error items of the most recently received group from a first location in said memory means and to read low error items of a previously received group from a second location in said memory means, said write control means being operative to write to a third location in the memory means low error items and to write to a fourth location in the memory means high error items, said third location previously storing high error items and said fourth location previously storing low error items.

4. The device of claim 3, wherein the first and fourth locations are the same.

5. The device of claim 3, wherein the second and third locations are the same.

6. The device of claim 3, wherein the read control and write control means are alternately operative.

7. A device for processing a first sequence of groups of digital data, each group having a uniform number of digital data items and each data item constituting a part of a second sequence of digital data items, each second sequence having one digital data item in each of said groups, said device comprising:

a) receiving means for receiving said first sequence of groups;

b) memory means for storing two of said groups at respective addresses, each address having one respective subaddress for each said second sequence;

c) error detecting means connected to the receiving means for detecting errors in said received items, said error detecting means having identifying means for identifying high error items whose errors exceed a given threshold and low error items whose errors are at or below the given threshold;

d) read control means connected to the error detecting means for reading the memory and for outputting a set of items, said set containing one item for each said second sequence of items, said read control means being operative in response to the most recently stored low error items in their respective second sequence of items to include in the set said low error items; and e) write control means connected to the error detecting means for receiving the groups of data items and for writing them into the memory means and being operative in response to the most recently stored low error items in their respective second sequence of data items, and writing the data item into the other sub-address pertaining to the same second sequence of data items.

* * * * *